(12) United States Patent
Sun et al.

(10) Patent No.: US 12,049,221 B2
(45) Date of Patent: Jul. 30, 2024

(54) MULTI-MODAL MULTI-AGENT TRAJECTORY PREDICTION

(71) Applicant: Waymo LLC, Mountain View, CA (US)

(72) Inventors: Pei Sun, Palo Alto, CA (US); Hang Zhao, Sunnyvale, CA (US); Alexander McCauley, Sunnyvale, CA (US); Benjamin Sapp, Marina del Rey, CA (US); Jiyang Gao, San Jose, CA (US); Dragomir Anguelov, San Francisco, CA (US); Xin Huang, Cambridge, MA (US); Kyriacos Christoforos Shiarlis, Oxford (GB)

(73) Assignee: Waymo LLC, Mountain View, CA (US)

( * ) Notice: Subject to any disclaimer, the term of this patent is extended or adjusted under 35 U.S.C. 154(b) by 315 days.

(21) Appl. No.: 17/540,140

(22) Filed: Dec. 1, 2021

(65) Prior Publication Data

US 2022/0169244 A1   Jun. 2, 2022

Related U.S. Application Data

(60) Provisional application No. 63/120,149, filed on Dec. 1, 2020.

(51) Int. Cl.
*B60W 30/095* (2012.01)
*B60W 40/04* (2006.01)
*B60W 50/00* (2006.01)
*B60W 60/00* (2020.01)
*G06N 3/049* (2023.01)

(52) U.S. Cl.
CPC ........ *B60W 30/0956* (2013.01); *B60W 40/04* (2013.01); *B60W 50/0097* (2013.01); *B60W 60/00274* (2020.02); *G06N 3/049* (2013.01)

(58) Field of Classification Search
CPC ....... B60W 30/0956; B60W 60/00274; B60W 40/04; B60W 50/0097; G06N 3/049
See application file for complete search history.

(56) References Cited

U.S. PATENT DOCUMENTS

| | | | |
|---|---|---|---|
| 9,635,181 B1* | 4/2017 | McGann | H04M 3/5238 |
| 10,782,694 B2* | 9/2020 | Zhang | G08G 1/167 |
| 11,829,139 B2* | 11/2023 | Jobanputra | G06F 9/547 |
| 2019/0137622 A1* | 5/2019 | Lopez-Hinojosa | B60W 30/09 |

OTHER PUBLICATIONS

Alahi et al., "Social LSTM: Human trajectory prediction in crowded spaces," Proceedings of the IEEE conference on computer vision and pattern recognition, 2016, pages pp. 961-971.
Battaglia et al., "Relational inductive biases, deep learning, and graph networks," CoRR, Jun. 2018, arXiv:1806.01261, 40 pages.

(Continued)

*Primary Examiner* — Gertrude Arthur Jeanglaude
(74) *Attorney, Agent, or Firm* — Fish & Richardson P.C.

(57) ABSTRACT

Methods, systems, and apparatus, including computer programs encoded on computer storage media, for agent trajectory prediction using temporal-spatial interaction predictions.

24 Claims, 4 Drawing Sheets

(56) References Cited

OTHER PUBLICATIONS

Casas et al., "Implicit latent variable model for scene-consistent motion forecasting," Proceedings of the European Conference on Computer Vision, Nov. 2020, pp. 624-641.

Casas et al., "SpAGNN: Spatially-aware graph neural networks for relational behavior forecasting from sensor data," 2020 IEEE International Conference on Robotics and Automation (ICRA), May 2020, pp. 9491-9497.

Chai et al., "Multipath: Multiple probabilistic anchor trajectory hypotheses for behavior prediction," CoRR, Oct. 2019, arxiv.org/abs/1910.05449, 14 pages.

Chang et al., "Argoverse: 3D tracking and forecasting with rich maps," Proceedings of the IEEE Conference on Computer Vision and Pattern Recognition, 2019, pp. 8748-8757.

Chen et al., "HGCN-GJS: Hierarchical graph convolutional network with groupwise joint sampling for trajectory prediction," CoRR, Sep. 2020, arXiv:2009.07140, 8 pages.

Choi, "Crash factors in intersection-related crashes: An on-scene perspective," Technical report, United States, National Highway Traffic Safety Administration, Sep. 2010, 37 pages.

Cui et al., "Multimodal trajectory predictions for autonomous driving using deep convolutional networks," 2019 International Conference on Robotics and Automation, May 2019, pp. 2090-2096.

Dai et al., "A flexible and explainable vehicle motion prediction and inference framework combining semisupervised AOG and ST-LSTM," IEEE Transactions on Intelligent Transportation Systems, Aug. 2020, 23(2):840-860.

Deo et al., "Multi-modal trajectory prediction of surrounding vehicles with maneuver based LSTMs," 2018 IEEE Intelligent Vehicles Symposium (IV), Jun. 2018, pp. 1179-1184.

Fang et al., "TPNet: Trajectory proposal network for motion prediction," Proceedings of the IEEE/CVF Conference on Computer Vision and Pattern Recognition, 2020, pp. 6797-6806.

Gao et al., "VectorNe Encoding hd maps and agent dynamics from vectorized representation," Proceedings of the IEEE/CVF Conference on Computer Vision and Pattern Recognition, 2020, pp. 11525-11533.

Gupta et al., "Social GAN: Socially acceptable trajectories with generative adversarial networks," Proceedings of the IEEE conference on computer vision and pattern recognition, 2018, pp. 2255-2264.

Helbing et al., "Social force model for pedestrian dynamics," Physical Review E, May 1995, 51(5):4282.

Huang et al., "DiversityGAN: Diversity-aware vehicle motion prediction via latent semantic sampling," IEEE Robotics and Automation Letters, Jun. 2020, 5(4):5089-5096.

Huang et al., "Online risk-bounded motion planning for autonomous vehicles in dynamic environments," Proceedings of the International Conference on Automated Planning and Scheduling, 2019. 29:214-222.

Huang et al., "Uncertainty-aware driver trajectory prediction at urban intersections," 2019 International Conference on Robotics and Automation, Aug. 2019, pp. 9718-9724.

Kamra et al., "Multi-agent trajectory prediction with fuzzy query attention," 34th Conference on Neural Information Processing Systems, 2020, 12 pages.

Khandelwal et al., "What-if motion prediction for autonomous driving," CoRR, Aug. 2020, arxiv.org/abs/2008.10587, 16 pages.

Kumar et al., "Interaction-based trajectory prediction over a hybrid traffic graph," 2021 IEEE/RSJ International Conference on Intelligent Robots and Systems (IROS), Sep. 2021, 12 pages.

Lee et al., "Desire: Distant future prediction in dynamic scenes with interacting agents," Proceedings of the IEEE Conference on Computer Vision and Pattern Recognition, 2017, pp. 336-345.

Lee et al., "Joint interaction and trajectory prediction for autonomous driving using graph neural networks," CoRR, Dec. 2019, arXiv:1912.07882, 9 pages.

Li et al., "End-to-end contextual perception and prediction with interaction transformer;" 2020 IEEE/RSJ International Conference on Intelligent Robots and Systems (IROS), Oct. 2021, 8 pages.

Mangalam et al., "It is not the journey but the destination: Endpoint conditioned trajectory prediction," Proceedings of the European Conference on Computer Vision (ECCV), Nov. 2020, pp. 759-776.

Marchetti et al., "Mantra: Memory augmented networks for multiple trajectory prediction," Proceedings of the IEEE/CVF Conference on Computer Vision and Pattern Recognition, 2020, pp. 7143-7152.

O'Kelly et al., "Scalable end-to-end autonomous vehicle testing via rare-event simulation," Advances in Neural Information Processing Systems, 2018, 12 pages.

Rhinehart et al., "Precog: Prediction conditioned on goals in visual multi-agent settings," Proceedings of the IEEE International Conference on Computer Vision, 2019, pp. 2821-2830.

Salzmann et al., "Trajectron++; Multi-agent generative trajectory forecasting with heterogeneous data for control," Proceedings of the European Conference on Computer Vision (ECCV), Jan. 2020, 13 pages.

Sen et al., "Analysis of lane change crashes," Technical report, United States, National Highway Traffic Safety Administration, Mar. 2003, 52 pages.

Tang et al., "Multiple futures prediction," Advances in Neural Information Processing Systems, 2019, 11 pages.

Wang et al., "Fast risk assessment for autonomous vehicles using learned models of agent futures," CoRR, May 2020, arxiv.org/abs/2005.13458, 9 pages.

Williams et al., "A learning algorithm for continually running fully recurrent neural networks," Neural Computation, Jun. 1989, 1(2):270-280.

Yamaguchi et al., "Who are you with and where are you going?" CVPR 2011, Jun. 2011 pp. 1345-1352.

Yuan et al., "Diverse trajectory forecasting with determinantal point processes," CoRR, Jul. 2019, arxiv.org/abs/1907.04967, 15 pages.

Zhan et al., "Interaction dataset: An international, adversarial and cooperative motion dataset in interactive driving scenarios with semantic maps," CoRR, Sep. 2019, arXiv:1910.03088, 13 pages.

Zhao et al., "Multi-agent tensor fusion for contextual trajectory prediction," Proceedings of the IEEE Conference on Computer Vision and Pattern Recognition, 2019, pp. 12126-12134.

Zhao et al., "TNT: Target-driven trajectory prediction," CoRR, Aug. 2020, arxiv.org/abs/2008.08294, 12 pages.

* cited by examiner

MULTI-MODAL MULTI-AGENT TRAJECTORY PREDICTION

CROSS-REFERENCE TO RELATED APPLICATION

This application claims priority to U.S. Provisional Application No. 63/120,149, filed on Dec. 1, 2020. The disclosure of the prior application is considered part of and is incorporated by reference in the disclosure of this application.

BACKGROUND

This specification relates to predicting the future trajectory of an agent in an environment. The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

SUMMARY

This specification generally describes a system implemented as computer programs on one or more computers in one or more locations that predicts the future trajectory of one or more agents in a scene in an environment by accounting for interactions between the agents in the scene.

The subject matter described in this specification can be implemented in particular embodiments so as to realize one or more of the following advantages.

Multi-agent behavior prediction is important in autonomous driving. However, multi-agent behavior prediction is a difficult task due to multimodalities among multiple agents during agent interactions. In particular, the future trajectories for the agents in the scene over a future time period will change depending on which other agents interact with one another during the time period and where and when those interactions occur. An agent interaction between two agents occurs when the two agents are in the same region of the environment within a threshold amount of time of one another. Even when an agent interaction occurs, the interaction can be multi-modal, i.e., the interaction can occur at any of multiple space-time points. The point at which the interaction occurs impacts the future trajectories of not only the interacting agents but in some cases the interactions of other agents in the environment. The described techniques account for this by explicitly modeling this multi-agent multi-modality scenario using a multi-stage prediction model that explicitly models interactions before predicting future trajectories. This allows accuracy and consistency in multi-agent predictions and offers explainability in the predicted trajectories. In particular, the described techniques divide complex multi-agent distribution into smaller pieces, by factoring out multi-modality in interactions into a set of spatial-temporal interaction points. The techniques then generate accurate and consistent trajectories conditioning on the predicted interaction points. The resulting model therefore achieves better accuracy in predicting trajectories and in identifying high-level interaction patterns relative to other techniques that do not model interactions or only model interactions in an implicit latent space.

The described techniques can also be used in simulating counterfactual interaction scenarios that can be beneficial in offline verification for autonomous driving algorithms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "trajectory prediction system," to generate a respective trajectory prediction for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples can be used to effectively train the trajectory prediction system to accurately and reliably make predictions.

While this specification describes that trajectory prediction outputs are generated on-board an autonomous vehicle, more generally, the described techniques can be implemented on any system of one or more computers that receives data characterizing scenes in an environment. As another example, the trajectory predictions may be made in a computer simulation of a real-world environment being navigated through by a simulated autonomous vehicle and the target agents. Generating these predictions in simulation may assist in controlling the simulated vehicle, in testing the realism of certain situations encountered in the simulation, and in ensuring that the simulation includes surprising interactions that are likely to be encountered in the real-world. More generally, generating these predictions in simulation can be part of testing the control software of a real-world autonomous vehicle before the software is deployed on-board the autonomous vehicle, of training one or more machine learning models that will layer be deployed on-board the autonomous vehicle or both.

Figure 1A:
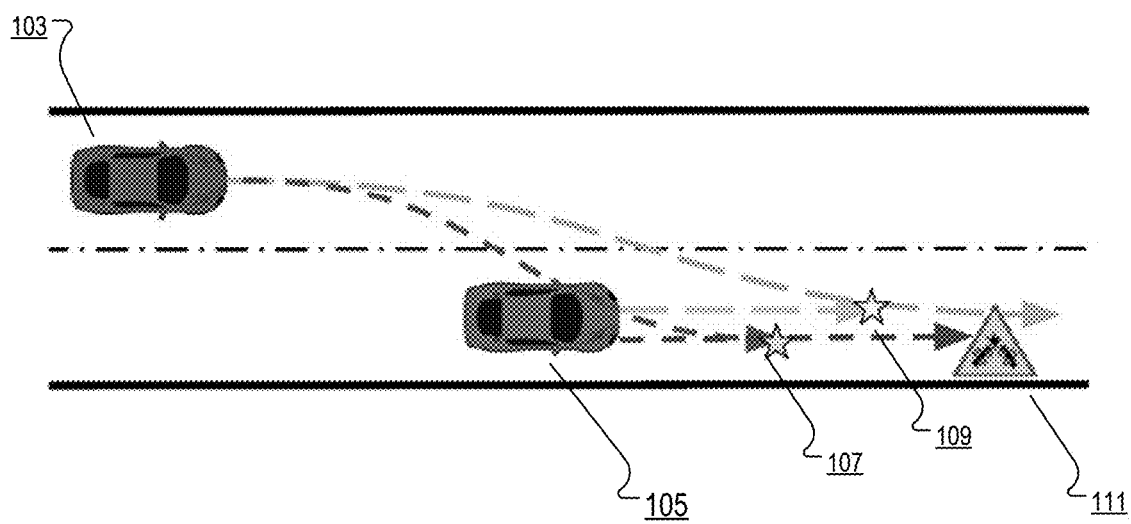
FIG. 1A shows an example interaction between two agents in an environment.

FIG. 1A shows an example interaction between two agents 103 and 105 in an environment.

In the example of FIG. 1A, the agent 103 is beginning a lane merge in order to change lanes into the same lane as the agent 105. This lane merge will result in an "interaction" between agent 103 and 105. That is, performing the lane merge will result in the agent 103 being in the same region of the environment as the agent 105 at almost the same time, i.e., within a threshold amount of time of one another.

When trajectory predictions are made by conventional trajectory prediction systems that do not model interactions, even if the conventional system correctly predicts that the agent 103 intends to change lanes while the agent 105 intends to stay in the same lane, the system can predict that the agents 103 and 105 will collide at a collision point 111, i.e., can generate trajectories for the agents 103 and 105 that are inconsistent with one another.

Even if a system can model interactions between agents, there exist multiple merging options for performing the merge. Each option is defined by a high-level interaction intention, which includes interaction position, e.g., the positions marked by stars 107 and 109, and interaction time. The described prediction techniques predict both high-level interaction intentions and low-level trajectories that are consistent with the intentions. That is, the described techniques account for the multiple modalities of any given interaction by predicting trajectories that are consistent with each of the interaction modalities.

Figure 1B:
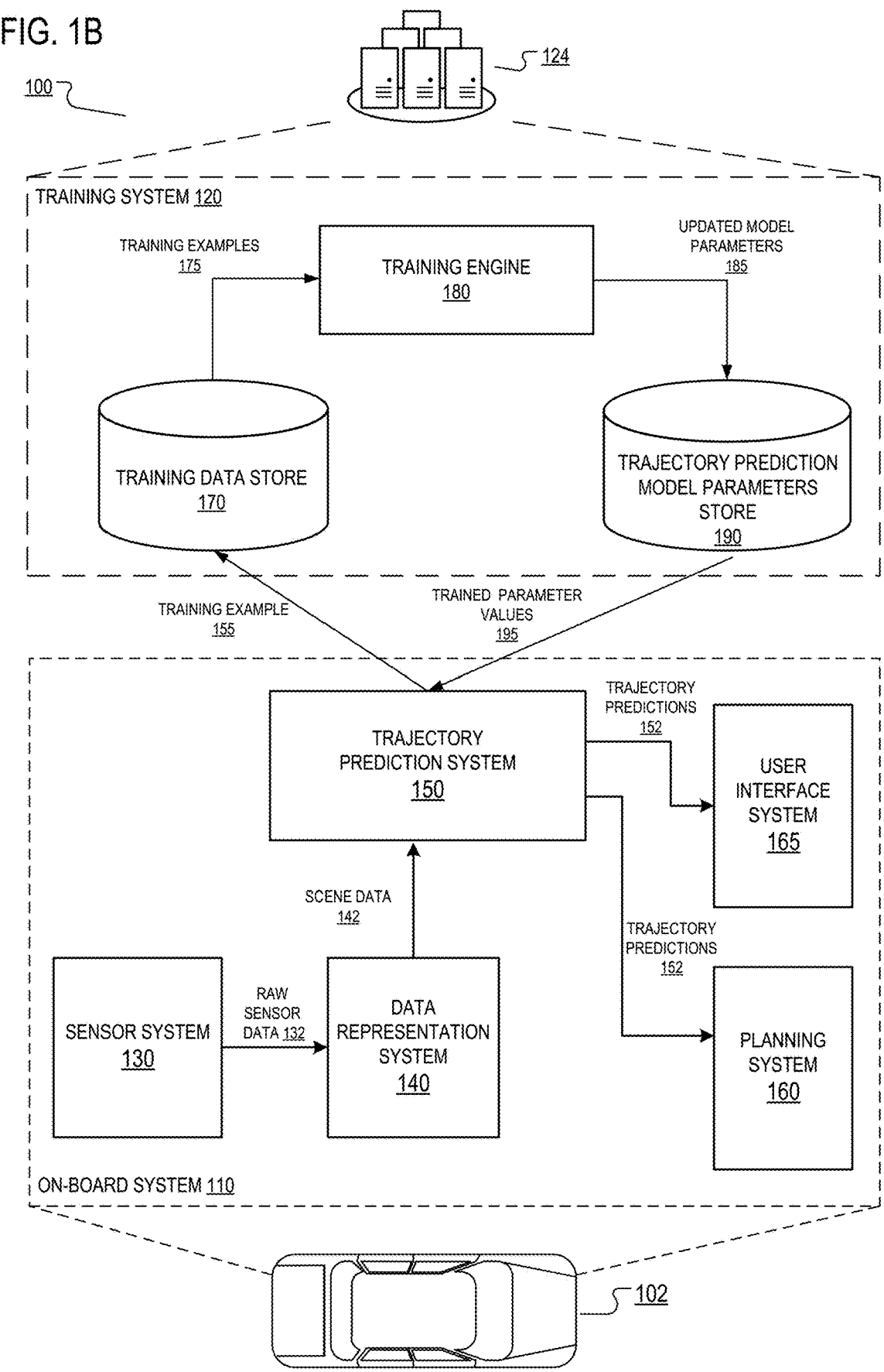
FIG. 1B is a diagram of an example system.

FIG. 1B is a diagram of an example system 100. The system 100 includes an on-board system 110 and a training system 120.

The on-board system 110 is located on-board a vehicle 102. The vehicle 102 in FIG. 1B is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and other data characterizing the environment, e.g., map data that identifies map features in the vicinity of the vehicle, and generates context data 142. The context data 142 characterizes the current state of the environment surrounding the vehicle 102 as of the current time point.

In particular, the context data 142 includes at least (i) data characterizing observed trajectories for each of one or more agents in an environment, i.e., observed trajectories for one or more of the surrounding agents, and (ii) data characterizing map features of a map of the environment. The data characterizing the observed trajectories can include data specifying the location of the corresponding surrounding agent at the current time step and one or more time steps that precede the time step. The data can optionally also include other information, e.g., the heading of the agent, the velocity of the agent, the type of the agent, and so on. Map features can include lane boundaries, crosswalks, stoplights, road signs, and so on.

The data representation system 140 provides the context data 142 to a trajectory prediction system 150, also on-board the vehicle 102.

The trajectory prediction system 150 processes the context data 142 to generate a respective trajectory prediction output 152, i.e., one or more predicted trajectories, for each of one or more of the surrounding agents. The trajectory prediction output 152, i.e., the predicted trajectory, for a given agent characterizes the predicted future trajectory of the agent after the current time point.

As a particular example, a predicted trajectory in the trajectory prediction output 152 for a given agent can include predicted trajectory states for the agent, i.e., locations and optionally other information such as headings, at each of multiple future time points that are after the current time point, e.g., for each future time point in a fixed size time window following the current time point.

When multiple interaction modalities exist among the agents in the scene, the trajectory prediction output 152 for a given agent can include a respective predicted trajectory for each of the interaction modalities, with each predicted trajectory including predicted trajectory states for the agent, i.e., locations and optionally other information such as headings, at each of multiple future time points that are after the current time point, e.g., for each future time point in a fixed size time window following the current time point. In some cases, the trajectory prediction system 150 can generate a respective score for each modality that represents the predicted likelihood that the modality will be the actual modality for the interactions that occur among the agents in the scene.

Generating the trajectory prediction outputs 152 will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the trajectory prediction system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include context data, i.e., like the context data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the context data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

Training the trajectory prediction system 150 is described in more detail below with reference to FIG. 3.

Figure 2:
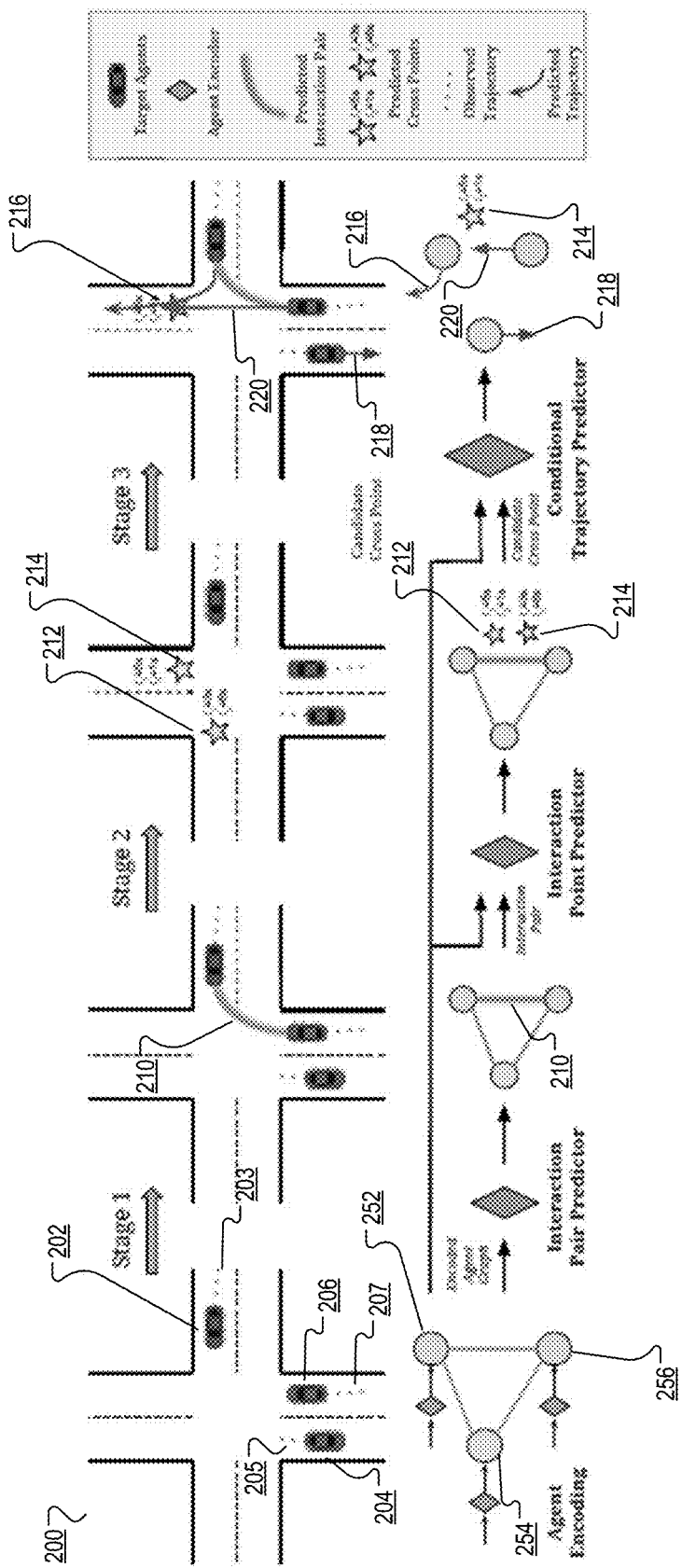
FIG. 2 is an illustration of generating a trajectory prediction for a target agent in a scene in the environment.

FIG. 2 is an illustration of generating respective trajectory predictions for target agent in a scene 200 of an environment.

In the example of FIG. 2, the scene 200 includes three target agents 202, 204, and 206.

While the example of FIG. 2 describes generating a trajectory prediction for each agent in the scene, in practice, the described techniques can be used to generate a respective predicted trajectory for each agent in the scene or for a proper subset of the agents in the scene.

At a high level, a system, e.g., the on-board system 110 of FIG. 1B, generates the trajectory prediction in three stages.

In stage 1, the system predicts which agents in the scene are likely to interact with each other after the current time point, i.e., during the future time period to be covered by the predicted trajectory. More specifically, the system predicts one or more interacting pairs of agents. Each interacting pair of agents includes two agents from the plurality of agents in the scene that are likely to, i.e., as predicted by the system, interact with one another during a future time period after the current time point.

As used in this specification, two agents are considered to interact if their paths cross within a threshold amount of time. That is, two agents interact if they are in the same region of the environment within a threshold amount of time of one another. Examples of driving maneuvers that can result in an interaction include lane changes, yielding at an intersection, right turns, and lane merges.

In the example of FIG. 2, the system has identified an interacting pair of agents 210 that includes the target agent 202 and the target agent 206. That is, the system has determined that the agent 202 and the agent 206 are likely to interact during the future time period.

In stage 2, for each interacting pair of agents, the system predicts how the predicted interacting agents in the pair are likely to interact.

More specifically, the system determines, from the scene data and for each of the interacting pairs of agents, a respective temporal-spatial point prediction for the interacting pair of agents that characterizes (i) a location in the environment at which the pair of agents will likely interact and (ii) a future time at which the pair of agents will likely interact.

As a particular example, the respective temporal-spatial point prediction for the interacting pair of agents can define one or more temporal-spatial points and a respective likelihood for each point that represents the predicted likelihood that the point is the one at which the pair of agents will interact. A temporal-spatial point is one that includes a spatial location, e.g., two-dimensional coordinates in a top-down coordinate system for the scene 200, at which an interaction will occur and a time point at which the interaction will occur.

In the example of FIG. 2, the system has predicted a temporal-spatial point 214, also referred to as a "predicted cross point," and a temporal-spatial point 216 for the interacting pair 210 that includes the target agent 202 and the target agent 206. The points 214 and 216 are two predictions of spatial-temporal points at which the target agent 202 and the target agent 206 can interact.

In stage 3, the system then predicts future trajectories for one or more of the agents in the scene based on how the interacting agents are predicted to interact, i.e., based on the respective temporal-spatial point predictions for the interacting pairs.

In the example of FIG. 2, the system has generated a predicted future trajectory 216 for the target agent 202, a predicted future trajectory 218 for the target agent 204, and a predicted future trajectory 220 for the target agent 206 assuming that the agents 202 and 206 interact at the temporal-spatial point 214.

In practice, the system can generate respective trajectories for each agent in the scene (or some subset of the agents in the scene) for multiple overall interaction modalities, i.e., multiple possible combinations of temporal-spatial points for different pairs of interacting agents. As a particular example, the system can generate respective trajectories for each agent in the scene for each overall interaction modality, i.e., each possible combination of temporal-spatial points for the pairs of interacting agents. Thus, the output of the system accounts for multiple different modalities of interaction between the different agents in the scene. That is, in the example of FIG. 2, the system can also generate respective future trajectories for the agents 202, 204, and 206 assuming that the interaction between the agent 202 and the agent 206 occurs at point 214 in addition to generating the trajectories that assume that the interaction occurs at point 216. The system can also generate respective scores for the points 214 and 216 that each represent a predicted likelihood that the corresponding point is the point at which the interaction will actually occur.

Generating a trajectory prediction output is described in more detail below with reference to FIG. 3.

Figure 3:
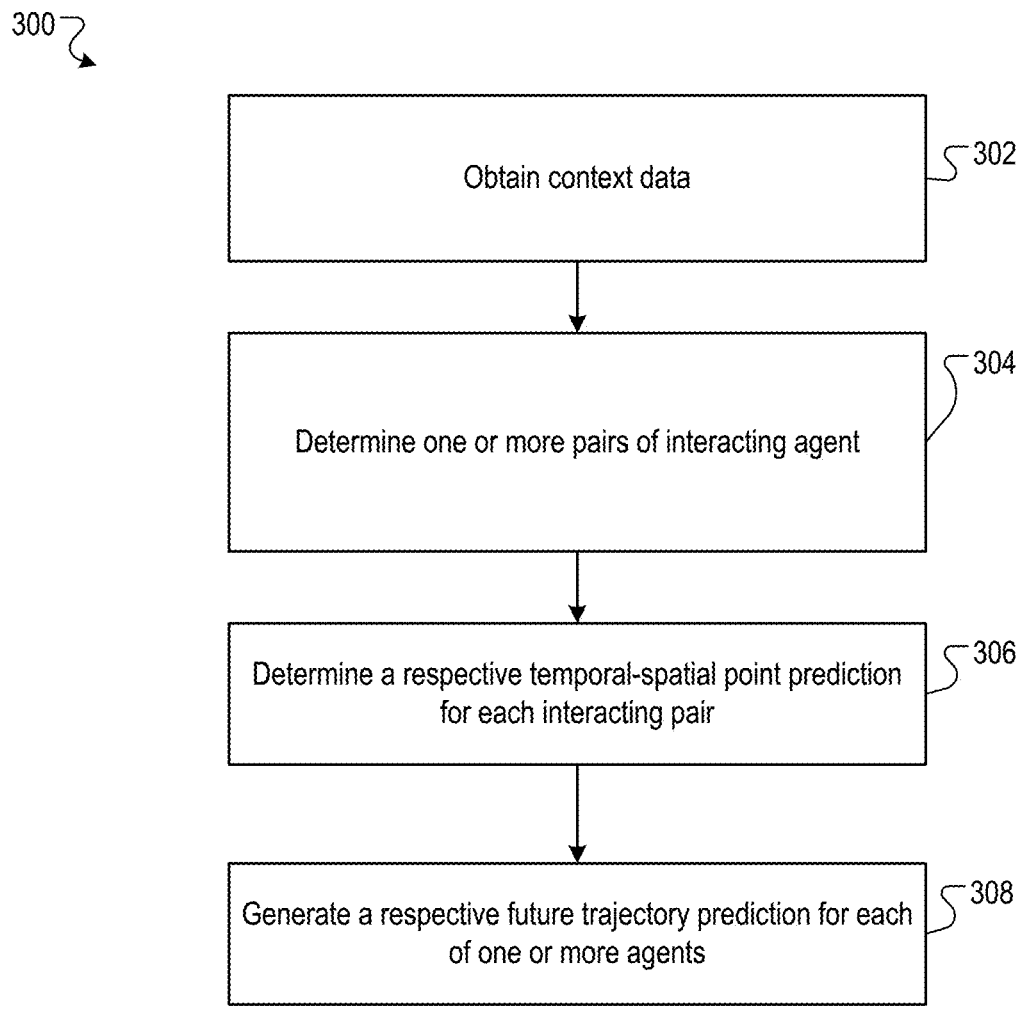
FIG. 3 is a flow diagram of an example process for generating a trajectory prediction output.

FIG. 3 is a flow diagram of an example process 300 for generating a trajectory prediction output for one or more agents in the vicinity of the vehicle. For convenience, the process 300 will be described as being performed by a system of one or more computers located in one or more locations. For example, a trajectory prediction system, e.g., the trajectory prediction system 150 of FIG. 1B, appropriately programmed in accordance with this specification, can perform the process 300.

At any given time point, the system can perform the process 300 to generate a respective trajectory prediction for each of one or more agents in the vicinity of the vehicle. For example, the system can perform the process 300 to generate a trajectory prediction for each agent that has been identified as being in the vicinity of the vehicle by the sensor subsystem or for a proper subset of the identified agents, e.g., only for those agents for which trajectory predictions are required by the planning system of the vehicle.

The system obtains context data characterizing the environment at a current time point (step 302). The context data includes data characterizing a plurality of agents in the environment at the current time point. In particular, the context data includes data characterizing trajectories of each of the plurality of agents at the current time point.

Returning to the example of FIG. 2, the context data includes data characterizing respective observed trajectories 203, 205, and 207 for the agents 202, 204, and 206. For example, the data can include respective trajectory states of each of the agents at each preceding time point in most recent window of preceding time points.

The context data also includes data characterizing map features of a map of the environment. Map features can include lane boundaries, crosswalks, stoplights, road signs, and so on.

The system determines, from the context data, one or more interacting pairs of agents (step 304). Each interacting pair of agents includes two agents from the plurality of agents that are likely to interact with one another during a future time period after the current time point.

As a particular example, the system can generate, from the context data, initial graph data representing an initial graph of the environment.

The initial graph of the environment has a plurality of nodes and edges, with each node representing a respective one of the plurality of agents and each edge connecting a respective pair of the nodes. The initial graph data, i.e., the data representing the initial graph, includes respective initial node features for each of the nodes and initial edge features for each of the edges for each of the plurality of agents. As a particular example, the initial graph can be a fully-connected graph, with each node connected to each other node by an edge.

To generate the initial graph data, the system can process the respective initial node features for each of the nodes, i.e., for each of the agents, by processing the scene data using a backbone encoder neural network. The backbone encoder neural network can be any appropriate neural network that maps context data to a respective feature vector for each of the agents in the scene. As a particular example, the system can represent the context data as polylines and the backbone encoder neural network can be a VectorNet that processes features of the polylines for each agent and each map feature to generate a respective feature vector for each agent and each map feature. The system can then use the respective feature vectors for each of the agents as the initial node features for the corresponding nodes in the initial graph.

To generate the respective initial edge features for each edge, the system can compute features that characterize the spatial relationship between the agents represented by the nodes that are connected by the edge. More specifically, the edge features represent differences between location, motion, or both of the agents represented by the nodes that are connected by the edge. For example, the features can include the difference between the locations of the two agents in a fixed coordinate system, e.g., a top-down coordinate system centered at the location of the autonomous vehicle. As another example, the features can include a difference between the headings of the two agents.

Returning to the example of FIG. 2, the system performs an agent encoding step to generate initial graph data representing an initial graph of the scene 200, with the initial graph including a first node 252 representing the target agent 202, a second node 254 representing the agent 204, and a third node representing the agent 206. Each node is connected to each other node by an edge.

To determine the one or more interacting pair of agents, the system can process the initial graph data using a first graph neural network that is configured to process the initial graph data to generate first updated graph data that includes first updated edge features for each of the edges. The first graph neural network can have any appropriate graph neural network architecture that performs one or more rounds of message passing on the node and edge features in order to generate updated edge features, i.e., where each round of message passing applies an update function and then an aggregation function to update the node and edge features that are input to the round of message. For example, the first graph neural network can employ message passing that uses a multi-layer perceptron (MLP) as the update function and unsorted segment summation as the aggregation function.

The system then, determines, from the first updated edge features for each of the edges, the one or more interacting pairs of agents.

As a particular example, the system can, for each edge, process the first updated edge features for the edge using a first neural network to generate an interaction prediction that predicts a likelihood that the pair of agents represented by the pair of nodes that the edge connects in the graph will interact during the future time period. That is, the prediction includes a likelihood score that represents the likelihood that the pair of agents will interact. For example, the system can process the first updated edge features for each edge independently using an MLP to generate the interaction prediction for the pair of agents. As another example, the system can process the first updated edge features in a manner that incorporates context for other pairs of agents, e.g., using a recurrent neural network (RNN) or a Transformer neural network.

Returning to the example of FIG. 2, the system performs an interaction pair prediction step to identify the pair 210 based on first updated edge features for the edge that connects the first node 252 and the third node 256.

The system can then select the one or more interacting pairs of agents based on the interaction predictions for the edges in the initial graph. For example, the system can identify a threshold number of pairs with the highest likelihood or identify each pair that has a likelihood that exceeds a threshold likelihood as interacting pairs.

The system determines, from the context data and for each of the interacting pairs of agents, a respective temporal-spatial point prediction for the interacting pair of agents that characterizes (i) a location in the environment at which the pair of agents will likely interact and (ii) a future time at which the pair of agents will likely interact (step 306).

More specifically, the respective temporal-spatial point prediction for a given interacting pair of agents defines one or more temporal-spatial points and a respective likelihood for each of the points that represents the predicted likelihood that the pair of agents will interact at the point.

In particular, the system can process the initial graph data using a second graph neural network that is configured to process the initial graph data to generate second updated graph data that includes second updated edge features for each of the edges and second updated node features for each of the nodes. The second graph neural network can have any appropriate graph neural network architecture. For example, the second graph neural network can have any of the architectures described above with reference to the first graph neural network.

The system can then determine, from the second updated edge features for the edges that connect nodes that represent one of the interacting pairs of agents or from the second updated node features for the nodes that belong to the two agents in the interacting pair, the respective temporal-spatial point prediction for each interacting pair of agents.

More specifically, the respective temporal-spatial point prediction includes, for each environment location in a discrete set of environment locations and for each agent in the pair, a likelihood score that represents a likelihood that the environment location will be the closest environment location in the discrete set to the location in the environment where the agent is located when the pair of agents will interact. The respective temporal-spatial point prediction can also include, for each agent, a respective likelihood score for each future time point in a discrete set of future time points that represents a likelihood that the future time point will correspond to the future time at which the pair of agents will interact.

The system can generate the discrete set of environment locations in any of a variety of ways. As one example, the system can uniformly sample environment locations from locations on the roadways identified in the map of the environment, e.g., at fixed intervals along the roadway. As a particular example, the system can sample environment locations from lane centerlines of the lanes of the roadways identified in the map of the environment. As another example, the system can uniformly sample points from a virtual grid overlaid over the map of the environment, e.g., so that the discrete set of environment locations can include locations that are not on the roadways identified in the map.

In some cases, the temporal-spatial point prediction can also include, for each environment location in the discrete set of environment locations and for each agent in the pair, a location offset that identifies a predicted offset from the environment location to the location in the environment at which the pair of agents will interact given that the environment location is the closest environment location in the discrete set to the location in the environment at which the pair of agents will interact.

In some implementations, the system can generate a joint temporal-spatial point prediction for each pair by, for each edge that connects two nodes that represent one of the interacting pairs of agents, processing the second updated edge features for the edge using a second neural network, e.g., an MLP, to generate the respective temporal-spatial point prediction for the interacting pair of agents. In these cases, the system assumes that each agent will be at the same location at the interaction time and generate a single temporal-spatial point prediction for the pair, i.e., such that the respective likelihood scores for the environment locations and the future time points and the offset are the same for both agents in the pair.

In some other implementations, for each pair, the system can generate an individual temporal-spatial point prediction for each agent in the pair by, for each node that represents one of the agents in the interacting pair of agents, processing the second updated node features for the node using a second neural network, e.g., an MLP, to generate a respective individual temporal-spatial point prediction for the agent. In these cases, the system assumes that there may be differences in the time points—locations of the agents when the interaction occurs, e.g., due to differences in object size, i.e., so that the centers of the two interacting objects are located at different places, due to quantization of time points and discrete locations in the environment introducing errors in the prediction, or both.

The system generates, from the context data and the respective temporal-spatial point predictions, a respective future trajectory prediction for each of one or more of the agents, i.e., either the entire set of agents in the scene or some proper subset of the entire set of agents, that characterizes a predicted future trajectory of the agent after the current time point (step 308).

In particular, the system selects, for each interacting pair, one or more temporal-spatial points using the respective temporal-spatial point prediction for the pair.

To select the points for a given pair when the temporal-spatial point prediction for the pair is made jointly, the system can generate a combined score for each location—time point combination, i.e., each possible combination of discrete environment location and discrete future time point. For example, the system can generate the combined score for a given combination by computing a product of the likelihood scores for the location and the time point in the combination. The system then selects, as the temporal-spatial point, a threshold number of highest scoring combinations or each combination that has a combined score that exceeds a threshold score. When the prediction also includes a location offset, for each selected combination, the system also applies the offset to the environment location in the combination to generate the final temporal-spatial point corresponding to the combination.

When the temporal-spatial point prediction for the pair is made separately, i.e., so that there is a respective, potentially different temporal-spatial point prediction for each agent in the pair, the system generates a first subset of points for the first agent and a second subset of points for the second agent. For example, the system can, for each agent, generate a combined score for each location—time point combination, e.g., by computing a product of the likelihood scores for the location and the time point in the prediction for the agent. The system then selects, as a subset of the temporal-spatial points, a threshold number of highest scoring combinations or each combination that has a combined score that exceeds a threshold score. When the prediction also includes a location offset and for each selected combination, the system also applies the offset to the environment location in the combination to generate the final temporal-spatial point corresponding to the combination.

Returning to the example of FIG. 2, the system performs an interaction point prediction step to generate the points 212 and 214 based on second updated edge features for the edge that connects the first node 252 and the third node 256.

For each different combination of temporal-spatial points for the interacting pairs, the system can then generate a respective predicted future trajectory for each of the one or more agents. For example, if there are two interacting pairs A and B in the scene and the system has generated points A1 and A2 for pair A and points B1 and B2 for pair B, the system would generate four different predicted future trajectories for the one or more agents, i.e., one trajectory if the interaction points are A1 and B1 one trajectory if the interaction points are A1 and B2, one trajectory if the interaction points are A2 and B1, and one trajectory if the interaction points are A2 and B2.

To generate a trajectory for a given combination, the system can perform the following steps.

The system can generate, from the initial graph data and the temporal-spatial points in the given combination, third updated graph data that includes third node features for each of the nodes and third edge features for each of the edges.

In particular, the system can generate the third updated graph data by, for each edge that connects nodes that represent an interacting pair, modifying the initial edge features for the edge based on the respective temporal-spatial point for the interacting pair in the given combination.

To modify the initial edge features for a given edge, the system can process the temporal-spatial point for the pair of agents represented by the nodes connected by the edge using a fourth neural network, e.g., another MLP, to generate interaction features for the edge and combine, e.g., concatenate, sum, or average, the initial edge features for the edge and the interaction features for the edge to generate the third edge features for the edge. For any edges that connect nodes that do not represent an interacting pair, the system can leave the initial edge features for the edge unchanged or can combine, e.g., concatenate, sum, or average, the initial edge features for the edge with default interaction features to generate the third edge features for the edge. The default interaction features can be, e.g., a feature vector that is the same dimensionality as the interaction features but includes all zeros or other predetermined values.

The system can then process the third graph data using a third graph neural network that is configured to process the third updated graph data to generate fourth updated graph data that includes fourth updated node features for each of the nodes. The third graph neural network can have any appropriate graph neural network architecture. For example, the third graph neural network can have any of the architectures described above with reference to the first graph neural network.

The system then generates, from the fourth updated node features for one or more of the nodes, a respective future trajectory prediction for each of the agents represented by the one or more nodes that characterizes a predicted future trajectory of the agent after the current time point. For example, the system can process each updated node feature independently using another neural network, e.g., an MLP, to generate the predicted future trajectory for the agent represented by the node. As another example, the system can process all of the node features jointly using another neural network, e.g., an MLP, an RNN, or a Transformer, to generate the predicted future trajectories for all of the agents in the scene jointly.

Returning to the example of FIG. 2, the system performs a conditional trajectory prediction step to generate the respective trajectories 216, 218, and 220 based on the fourth updated node features for the nodes 252, 254, and 256 assuming that the interaction occurs at point 214.

Once the system has generated the trajectory predictions, the system can provide (i) the trajectory predictions for the one or more agents, (ii) data derived from the trajectory predictions for the one or more agents, or (iii) both to an on-board system of the autonomous vehicle for use in controlling the autonomous vehicle.

As a particular example, the system can provide, for each possible different combination of temporal-spatial points for the interacting pairs, the trajectory predictions that were generated assuming that the interaction(s) occur(s) at the combination of points and the combined scores for the points in the different combination to provide an indication of how likely the combination is to occur. As a particular example, the system can compute an overall likelihood score for each combination, e.g., as a product of the combined scores for the points in the combination, and provide, for each possible different combination of temporal-spatial points for the interacting pairs, the trajectory predictions that were generated assuming that the interaction(s) occur at the combination of points and the overall likelihood score for the combination to provide an indication of how likely the combination is to occur.

As described above, prior to using the neural networks described above to perform inference, e.g., on-board the autonomous vehicle, a training system trains the neural networks on training data. The training data includes multiple training examples, with each training example including context data characterizing a scene in the environment at a corresponding time point and ground truth data that characterizes what actually occurred in the scene after the corresponding time point.

In particular, the ground truth data includes (i) ground truth interacting pair data, i.e., for each pair of agents in the scene at the current time point, whether the two agents interacted within a future time window after the current time point, (ii) a respective ground truth spatial-temporal point for each interacting pair that indicated the spatial-temporal point at which the interaction between the two agents in the pair actually occurred, and (iii) a respective actual future trajectory for each agent in the scene.

The system trains the neural networks described above for stages 1, 2, and 3 together, i.e., jointly to minimize an overall loss function that includes a respective term for each of the three stages. For example, the overall loss can be a weighted sum of the respective loss terms for each of the three stages. In some cases, the system also trains the backbone encoder jointly as part of minimizing the overall loss. In some other cases, the system uses a pre-trained backbone that has been pre-trained to perform a different behavior prediction task.

The loss term for stage 1 measures errors between the interaction predictions generated by the system and the ground truth interacting pair data. For example, the loss term for stage 1 can be the sum or the average of, for each pair of agents, the cross-entropy loss between (i) the interaction prediction for the agent and (ii) a ground truth set of scores that indicates whether the pair actually interacted.

The loss term for stage 2 measures, for each ground truth interacting pair, errors between (i) the respective temporal-spatial point prediction for the pair and (ii) the actual temporal-spatial point at which the pair interacted.

For example, the loss term can be a sum or a weighted sum of (i) the cross-entropy loss between a probability distribution over temporal-spatial points generated from the prediction for the pair and a probability distribution that identifies the temporal-spatial point that is closest to the actual temporal-spatial point at which the point interacted and (ii) the Huber loss between the predicted offset for the temporal-spatial point that is closest to the actual temporal-spatial point at which the point interacted and the actual offset between the closest temporal-spatial point and the actual temporal-spatial point.

The loss term for stage 3 measures, for each of the one or more agents for which trajectories were predicted, an error between the predicted trajectory given the ground-truth temporal-spatial point and the ground truth future trajectory for the agent. For example, the loss can be the sum or the average of the Huber losses between the two trajectories for each of the one or more agents.

To ensure that the loss terms are validly computed during training, the system can use teacher forcing when transitioning between stages 1 and 2 and stages 2 and 3. That is, during training, the system can provide the ground truth interacting pairs for use in stage 2 (instead of what was predicted by stage 1) and can provide the ground truth spatial-temporal point for each ground truth pair to stage 3 (instead of what was predicted by stage 2).

The system can train the neural networks on the overall loss function using any appropriate machine learning training technique, e.g., a gradient descent technique with any appropriate optimizer, e.g., stochastic gradient descent, Adam, rmsProp, or Adafactor.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   obtaining context data characterizing an environment, the context data comprising data characterizing a plurality of agents in the environment at a current time point, and the context data comprising data characterizing trajectories of each of the plurality of agents at the current time point;
   determining, from the context data, one or more interacting pairs of agents, wherein each interacting pair of agents includes two agents from the plurality of agents that are likely to interact with one another during a future time period after the current time point;
   determining, from the context data and for each of the interacting pairs of agents, a respective temporal-spatial point prediction for the interacting pair of agents that characterizes (i) a location in the environment at which the pair of agents will likely interact and (ii) a future time at which the pair of agents will likely interact;
   generating, from the context data and the respective temporal-spatial point predictions, a respective future trajectory prediction for each of one or more of the agents that characterizes a predicted future trajectory of the agent after the current time point; and
   controlling a vehicle based on the respective future trajectory prediction for each of one or more of the agents.

2. The method of claim 1, further comprising:
   generating, from the context data, initial graph data representing an initial graph of the environment, wherein:
      the initial graph of the environment comprises a plurality of nodes and edges, each node representing a respective one of the plurality of agents and each edge connecting a respective pair of the nodes, and
      the initial graph data comprises respective initial node features for each of the nodes and initial edge features for each of the edges for each of the plurality of agents.

3. The method of claim 2, wherein:
   generating the initial graph data comprises generating the respective initial node features for each of the nodes by processing the context data using a backbone encoder neural network to generate the respective initial node features for each of the plurality of agents.

4. The method of claim 2, wherein:
   generating the initial graph data comprises generating the respective initial edge features by computing features that represent a spatial relationship between the agents represented by the nodes that are connected by the edge.

5. The method of claim 2, wherein determining, from the context data, one or more interacting pairs of agents comprises:
   processing the initial graph data representing the initial graph of the environment using a first graph neural network that is configured to process the initial graph data to generate first updated graph data that comprises first updated edge features for each of the edges; and
   determining, from the first updated edge features for each of the edges, the one or more interacting pairs of agents.

6. The method of claim 5, wherein determining, from the first updated edge features for each of the edges, the one or more interacting pairs of agents comprises:
   for each of the edges in the initial graph, processing the first updated edge features for the edge using a first neural network to generate an interaction prediction that predicts a likelihood that the pair of agents represented by the pair of nodes that the edge connects in the graph will interact during the future time period; and
   selecting the one or more interacting pairs of agents based on the interaction predictions for the edges in the initial graph.

7. The method of claim 2, wherein determining, from the context data and for each of the interacting pairs of agents, a respective temporal-spatial point prediction for the interacting pair of agents comprises:
   processing the initial graph data using a second graph neural network that is configured to process the initial graph data to generate second updated graph data that comprises second updated edge features for each of the edges; and
   determining, from the second updated edge features for the edges that connect nodes that represent one of the interacting pairs of agents, the respective temporal-spatial point prediction for each interacting pair of agents.

8. The method of claim 7, wherein determining, from the second updated edge features for the edges that connect nodes that represent one of the interacting pairs of agents, a respective temporal-spatial point prediction for each interacting pair of agents comprises, for each interacting pair of agents:
   processing the second updated edge features for the edge that connects the nodes representing the interacting pair of agents using a second neural network to generate the respective temporal-spatial point prediction for the interacting pair of agents.

9. The method of claim 2, wherein determining, from the context data and for each of the interacting pairs of agents, a respective temporal-spatial point prediction for the interacting pair of agents comprises:
   processing the initial graph data using a second graph neural network that is configured to process the initial graph data to generate second updated graph data that comprises second updated node features for each of the node; and
   for each agent in the interacting pair, determining, from the second updated node features for the node that represents the agent, a respective temporal-spatial point prediction for the agent.

10. The method of claim 9, wherein determining, from the second updated node features for the node that represents the agent, a respective temporal-spatial point prediction for the agent comprises:
    processing the second updated node features for the node that represents the agent using a second neural network to generate the respective temporal-spatial point prediction for the agent.

11. The method of claim 2, wherein generating, from the context data and the respective temporal-spatial point predictions, a respective future trajectory prediction for each of one or more of the agents that characterizes a predicted future trajectory of the agent after the current time point comprises:

generating, from the initial graph data and the respective temporal-spatial point predictions, third updated graph data that comprises third node features for each of the nodes and third edge features for each of the edges;

processing the third graph data using a third graph neural network that is configured to process the third updated graph data to generate fourth updated graph data that comprises fourth updated node features for each of the nodes; and generating, from the fourth updated node features for one or more of the nodes, a respective future trajectory prediction for each of the agents represented by the one or more nodes that characterizes a predicted future trajectory of the agent after the current time point.

12. The method of claim 11, wherein generating the third updated graph data comprises:

for each edge that connects nodes that represent an interacting pair, modifying the initial edge features for the edge based on the respective temporal-spatial point prediction for the interacting pair.

13. The method of claim 12, wherein modifying the initial edge features comprises:

processing the temporal-spatial point prediction using a fourth neural network to generate interaction features for the edge; and combining the initial edge features for the edge and the interaction features for the edge to generate the third edge features for the edge.

14. The method of claim 13, wherein generating the third updated graph data further comprises:

for each edge that connects nodes that do not represent an interacting pair, combining the initial edge features for the edge with default interaction features to generate the third edge features for the edge.

15. The method of claim 11, wherein generating, from the fourth updated node features for one or more of the nodes, a respective future trajectory prediction for each of the agents represented by the one or more nodes comprises, for each of the one or more nodes:

processing the fourth updated node features for the node using a third neural network to generate the respective future trajectory prediction for the agent represented by the node.

16. The method of claim 1, wherein the respective temporal-spatial point prediction for the interacting pair of agents comprises, for each agent in the pair:

for each environment location in a discrete set of environment locations, a likelihood score that represents a likelihood that the environment location will be the closest environment location in the discrete set to the location in the environment of the agent when the pair of agents will interact.

17. The method of claim 16, wherein the respective temporal-spatial point prediction for the interacting pair of agents comprises, for each agent:

for each environment location in the discrete set of environment locations, a location offset that identifies a predicted offset from the environment location to the location in the environment of the agent when the pair of agents will interact given that the environment location is the closest environment location in the discrete set to the location in the environment of the agent when the pair of agents will interact.

18. The method of claim 1, wherein the respective temporal-spatial point prediction for the interacting pair of agents comprises, for each agent in the pair:

a respective likelihood score for each future time point in a discrete set of future time points that represents a likelihood that the future time point will correspond to the future time at which the pair of agents will interact.

19. The method of claim 1, wherein the respective future trajectory prediction comprises a respective predicted agent state at each of multiple future time points that are after the current time point.

20. The method of claim 1, wherein each of the plurality of agents is an agent in a vicinity of the vehicle, wherein the vehicle is an autonomous vehicle in an environment; and the context data comprises data generated from data captured by one or more sensors of the autonomous vehicle.

21. The method of claim 20 further comprising:

providing (i) the trajectory predictions for the one or more agents, (ii) data derived from the trajectory predictions for the one or more agents, or (iii) both to an on-board system of the autonomous vehicle for use in controlling the autonomous vehicle.

22. The method of claim 1, wherein:

each of the plurality of agents is a simulated agent in a vicinity of the vehicle, wherein the vehicle is a simulated autonomous vehicle in a computer simulation of a real-world environment; and the context data comprises data that simulates data captured by one or more sensors of an autonomous vehicle in the real-world environment.

23. One or more non-transitory computer-readable storage media storing instructions that when executed by one or more computers cause the one or more computers to perform operations comprising:

obtaining context data characterizing an environment, the context data comprising data characterizing a plurality of agents in the environment at a current time point, and the context data comprising data characterizing trajectories of each of the plurality of agents at the current time point;

determining, from the context data, one or more interacting pairs of agents, wherein each interacting pair of agents includes two agents from the plurality of agents that are likely to interact with one another during a future time period after the current time point;

determining, from the context data and for each of the interacting pairs of agents, a respective temporal-spatial point prediction for the interacting pair of agents that characterizes (i) a location in the environment at which the pair of agents will likely interact and (ii) a future time at which the pair of agents will likely interact;

generating, from the context data and the respective temporal-spatial point predictions, a respective future trajectory prediction for each of one or more of the agents that characterizes a predicted future trajectory of the agent after the current time point; and controlling a vehicle based on the respective future trajectory prediction for each of one or more of the agents.

24. A system comprising one or more computers and one or more storage devices storing instructions that when executed by the one or more computers cause the one or more computers to perform operations comprising:

obtaining context data characterizing an environment, the context data comprising data characterizing a plurality of agents in the environment at a current time point, and the context data comprising data characterizing trajectories of each of the plurality of agents at the current time point;

determining, from the context data, one or more interacting pairs of agents, wherein each interacting pair of agents includes two agents from the plurality of agents that are likely to interact with one another during a future time period after the current time point;

determining, from the context data and for each of the interacting pairs of agents, a respective temporal-spatial point prediction for the interacting pair of agents that characterizes (i) a location in the environment at which the pair of agents will likely interact and (ii) a future time at which the pair of agents will likely interact;

generating, from the context data and the respective temporal-spatial point predictions, a respective future trajectory prediction for each of one or more of the agents that characterizes a predicted future trajectory of the agent after the current time point; and controlling a vehicle based on the respective future trajectory prediction for each of one or more of the agents.

* * * * *